United States Patent
Ueda

(10) Patent No.: US 10,117,079 B2
(45) Date of Patent: Oct. 30, 2018

(54) INFORMATION PROCESSING APPARATUS AND RECORDING MEDIUM

(71) Applicant: Shigeo Ueda, Kanagawa (JP)

(72) Inventor: Shigeo Ueda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 15 days.

(21) Appl. No.: 15/166,859

(22) Filed: May 27, 2016

(65) Prior Publication Data

US 2016/0360348 A1 Dec. 8, 2016

(30) Foreign Application Priority Data

Jun. 8, 2015 (JP) ................................ 2015-115776
Mar. 15, 2016 (JP) ................................ 2016-051651

(51) Int. Cl.
G09G 5/02 (2006.01)
H04W 4/80 (2018.01)
G09G 5/10 (2006.01)
H04W 76/14 (2018.01)
G09G 5/00 (2006.01)

(52) U.S. Cl.
CPC ................ H04W 4/80 (2018.02); G09G 5/00 (2013.01); G09G 5/02 (2013.01); G09G 5/10 (2013.01); H04W 76/14 (2018.02); G09G 2320/0626 (2013.01); G09G 2320/0666 (2013.01); G09G 2320/08 (2013.01); G09G 2340/14 (2013.01); G09G 2370/16 (2013.01)

(58) Field of Classification Search
None
See application file for complete search history.

(56) References Cited

U.S. PATENT DOCUMENTS

| | | | |
|---|---|---|---|
| 2007/0141997 A1* | 6/2007 | Wulff | G06K 19/0723 455/78 |
| 2014/0011452 A1* | 1/2014 | Ji | H04B 5/00 455/41.1 |
| 2014/0376050 A1* | 12/2014 | Baba | H04N 1/00307 358/1.15 |
| 2015/0061968 A1* | 3/2015 | Park | G06F 3/1423 345/2.1 |
| 2016/0183180 A1* | 6/2016 | Garcia Martin | H04W 48/18 370/328 |
| 2016/0291912 A1* | 10/2016 | Baba | H04B 5/0056 |

FOREIGN PATENT DOCUMENTS

| | | |
|---|---|---|
| JP | 2011-060046 | 3/2011 |
| JP | 2015-005952 | 1/2015 |

* cited by examiner

Primary Examiner — Martin Mushambo
(74) Attorney, Agent, or Firm — Oblon, McClelland, Maier & Neustadt, L.L.P.

(57) ABSTRACT

An information processing apparatus includes: a communication unit configured to perform communication with a short-distance wireless communication tag; a display control unit configured to display position information of the communication unit on a display unit; and a first determining unit configured to determine whether an establishing signal for establishing the communication is received from the short-distance wireless communication tag. The communication unit performs the communication with the short-distance wireless communication tag in response to the first determining unit determining that the establishing signal is received.

12 Claims, 17 Drawing Sheets

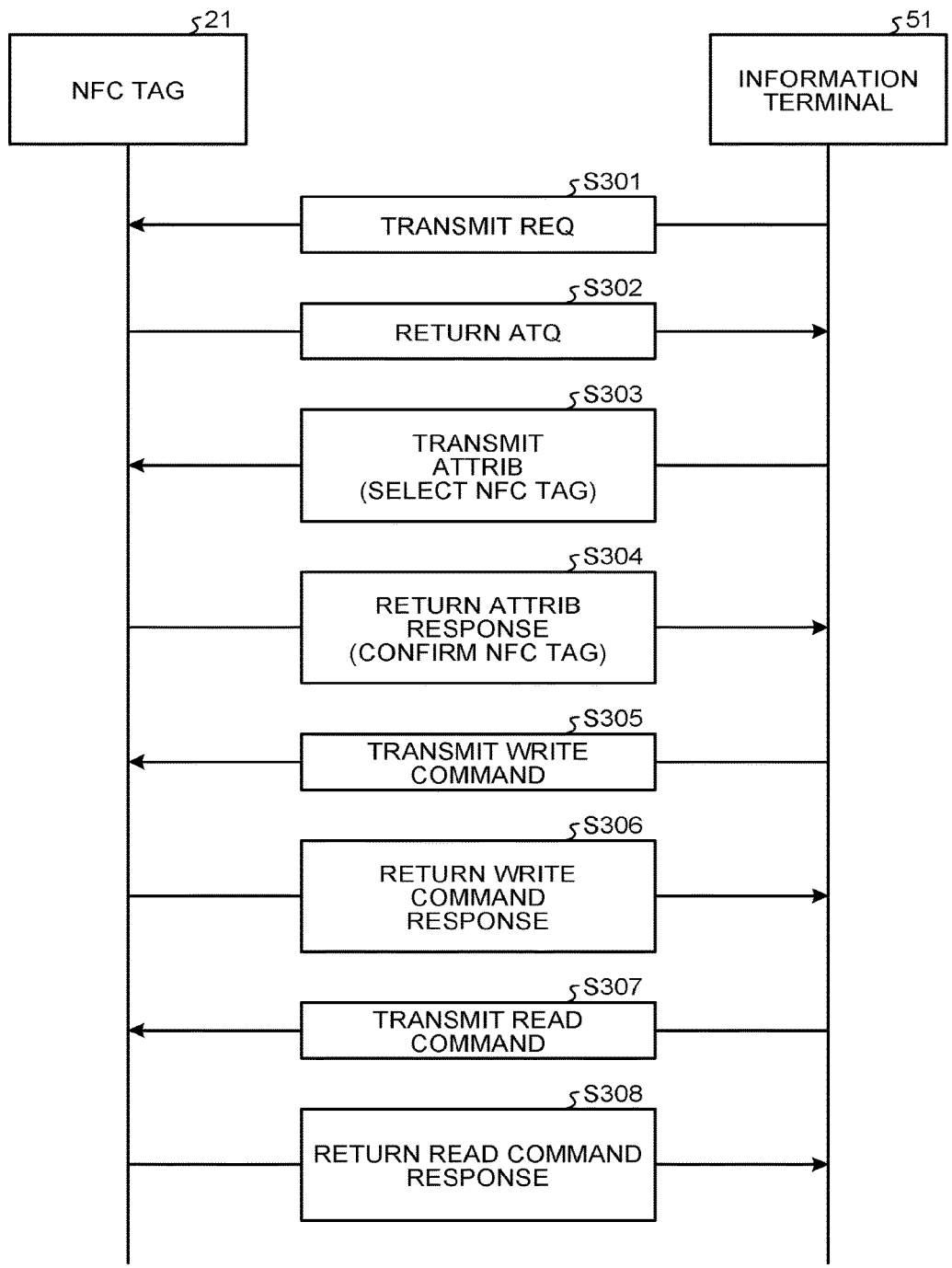

INFORMATION PROCESSING APPARATUS AND RECORDING MEDIUM

CROSS-REFERENCE TO RELATED APPLICATIONS

The present application claims priority under 35 U.S.C. § 119 to Japanese Patent Application No. 2015-115776, filed on Jun. 8, 2015 and Japanese Patent Application No. 2016-051651, filed on Mar. 15, 2016, the contents of which are incorporated herein by reference in their entirety.

BACKGROUND OF THE INVENTION

1. Field of the Invention

The present invention relates to an information processing apparatus and a recording medium.

2. Description of the Related Art

A short-distance wireless communication technology is used in mobile terminal devices, office equipments, public transportation infrastructures, and the like. This technology is generally called radio frequency identifier (RFID) and performs individual authentication and individual identification using radio waves. In particular, Near Field Communication (NFC) is expected to be most widely used in the future. NFC is a short-distance wireless communication technology using a frequency band of 13.56 megahertz (MHz), and a communication distance is equal to or smaller than 10 centimeters (cm).

In recent years, smartphones and tablet personal computers (PC) are increasingly equipped with NFC, and NFC is used for a payment process, individual authentication, or the like. In NFC, there have been known a technology with a reader/writer function capable of actively reading and writing data, and an NFC tag with a function to only hold written data and allow a reader/writer to read the data.

SUMMARY OF THE INVENTION

According to one aspect of the present invention, an information processing apparatus includes a communication unit, a display control unit, and a first determining unit. The communication unit is configured to perform communication with a short-distance wireless communication tag. The display control unit is configured to display position information of the communication unit on a display unit. The first determining unit is configured to determine whether an establishing signal for establishing the communication is received from the short-distance wireless communication tag. The communication unit performs the communication with the short-distance wireless communication tag in response to the first determining unit determining that the establishing signal is received.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram for explaining an outline of a communication method for NFC used in the information processing apparatus according to the embodiment;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
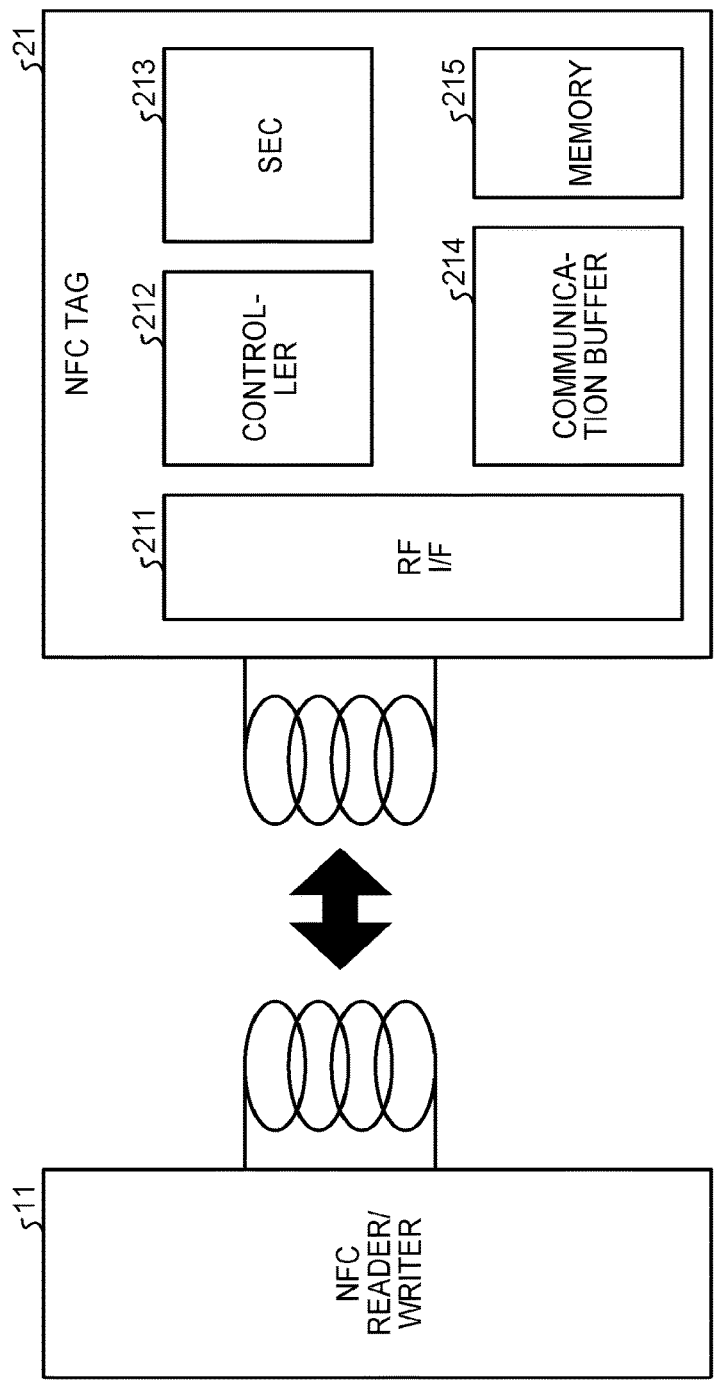
FIG. 1 is a block diagram for explaining a basic overall configuration of an RFID (NFC) used in an information processing apparatus according to an embodiment.

The terminology used herein is for the purpose of describing particular embodiments only and is not intended to be limiting of the present invention.

As used herein, the singular forms "a", "an" and "the"are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Exemplary embodiments for carrying out the present invention will be described in detail below with reference to the drawings. In each of the drawings, the same or equivalent components are denoted by the same symbols and the same explanation will be appropriately simplified or omitted. While the embodiments will be described below, embodiments are not limited to the embodiments described below. In the embodiments below, a case in which NFC is used as an example of a short-distance wireless communication technology, will be described. However, the present invention is applicable to a case in which other standards in the short-distance wireless communication technology are used.

An embodiment of the present invention relates to an information processing apparatus including a built-in communication unit, such as an NFC antenna, that performs communication with a short-distance wireless communication tag, such as an NFC tag. In the embodiment, position information of the built-in NFC antenna is displayed. A user or the like refers to the displayed position information and holds the NFC antenna of the information processing apparatus near the NFC tag. If a predetermined positional relationship is established between the NFC antenna and the NFC tag, the information processing apparatus determines whether a signal for starting short-distance wireless communication is received from the NFC tag.

If it is determined that the signal for starting the short-distance wireless communication is received, it is determined whether a signal for establishing the short-distance wireless communication is received from the NFC tag.

Furthermore, if it is determined that the signal for establishing the short-distance wireless communication is received, communication between the information processing apparatus and the NFC tag is performed. The embodiment will be described in detail below with reference to the drawings.

First, a basic overall configuration of an RFID (NFC) used in the information processing apparatus according to the embodiment will be described. FIG. 1 is a block diagram for explaining the basic overall configuration of the RFID (NFC) used in the information processing apparatus according to the embodiment.

An NFC reader/writer 11 is an information terminal device, such as a smartphone or tablet PC, equipped with an NFC function. An NFC tag 21 includes a radio frequency (RF) interface (I/F) 211, a controller 212, a security (SEC) 213, a communication buffer 214, and a memory 215. The controller 212 controls the entire NFC tag 21. The communication buffer 214 exchanges data with the NFC reader/writer 11. The memory 215 is a recording medium for holding data. The SEC 213 has a function to ensure the security such as data encryption.

The NFC reader/writer 11 and the NFC tag 21 generate an electromotive force through electromagnetic induction using antennas to communicate with each other. The NFC reader/writer 11 continuously generates a magnetic field, and electromagnetic induction occurs when the NFC reader/writer 11 approaches a passive tag of the NFC tag 21, so that an electromotive force is generated on the NFC tag 21. The NFC tag 21 operates with the generated electromotive force, and transmits data if needed. The NFC tag 21 stores therein, for example, authentication data (an ID or the like) needed for communication, or information (an address, security data, or the like) that enables communication between devices.

Figure 2:
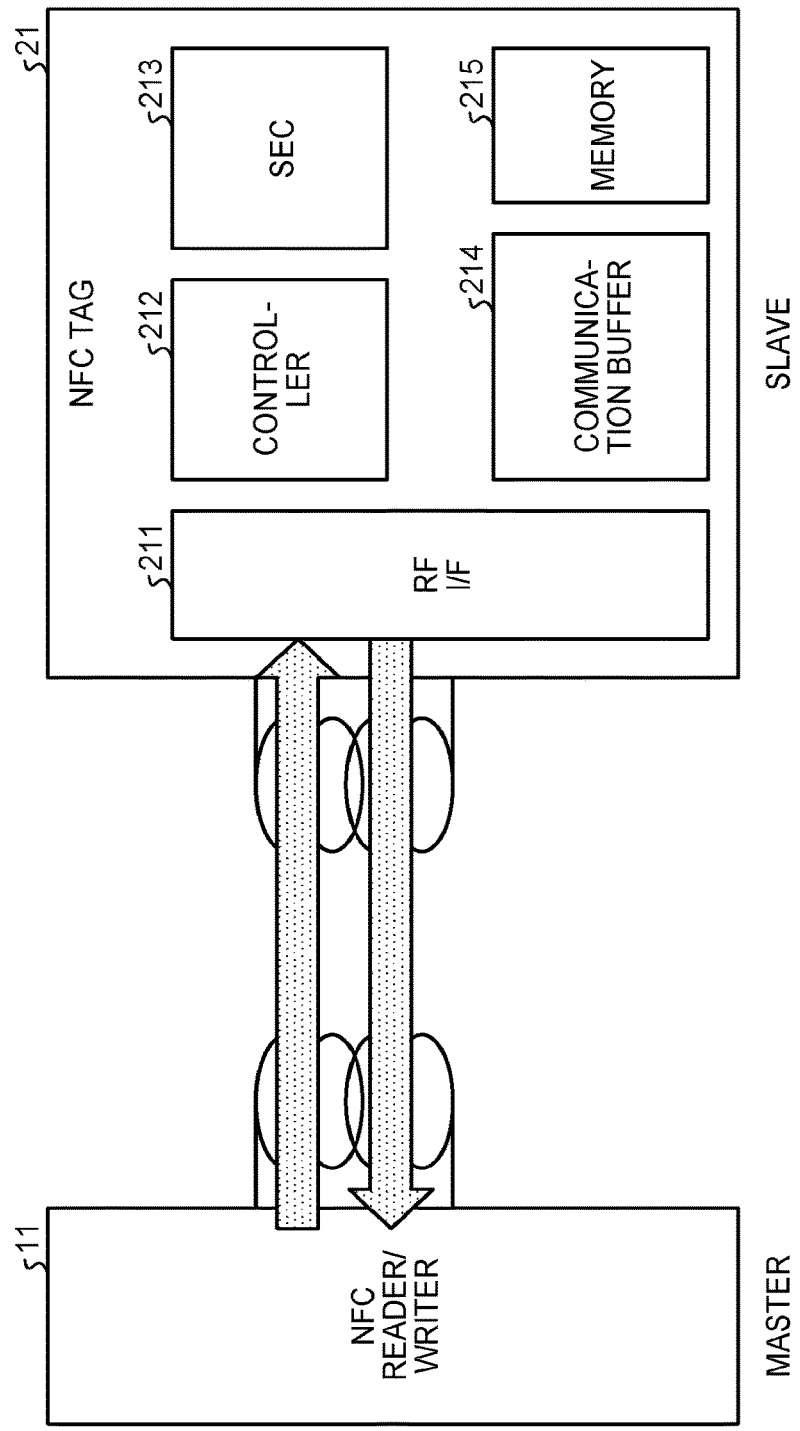
FIG. 2 is a diagram for explaining a communication method for NFC used in the information processing apparatus according to the embodiment.

Next, a communication method for NFC used in the information processing apparatus according to the embodiment will be described. FIG. 2 is a diagram for explaining the communication method for NFC used in the information processing apparatus according to the embodiment.

The NFC reader/writer 11 basically serves as a master device and controls all kinds of communication. The NFC tag 21 serves as a slave device, and sends a response in accordance with an access from the master device. The NFC tag 21 is called a passive tag, which only responds to a request from the master device and does not perform active operation. The magnetic field is generated by the master device.

Figure 3:
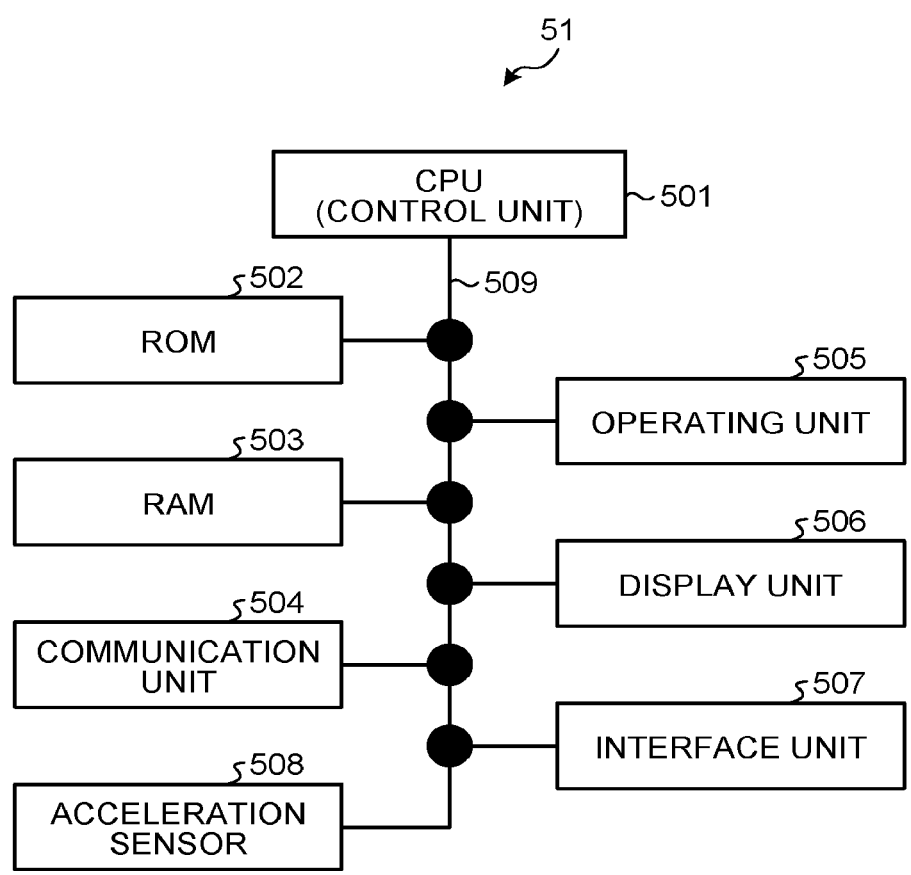
FIG. 3 is a hardware block diagram illustrating an overall configuration of the information processing apparatus according to the embodiment.

Next, an overall configuration of the information processing apparatus according to the embodiment will be described. FIG. 3 is a hardware block diagram illustrating an overall configuration of an information terminal 51 as the information processing apparatus according to the embodiment.

As illustrated in FIG. 3, the information terminal 51 includes, as the hardware configuration, a central processing unit (CPU) 501, a read only memory (ROM) 502, a random access memory (RAM) 503, a communication unit 504, an operating unit 505, a display unit 506 (an example of a display unit), an interface unit 507, an acceleration sensor 508, and a bus 509. The CPU 501 controls the entire information terminal 51. Storage units, such as the ROM 502 and the RAM 503, store therein various kinds of data, various programs, position information of a built-in NFC antenna to be described later, and the like. The CPU 501 loads a control program stored in the ROM 502, and deploys various kinds of data obtained through operations by the information terminal 51 onto the RAM 503. The communication unit 504 performs normal wireless communication using an antenna and short-distance wireless communication.

The operating unit 505 is a keyboard, a mouse, or the like by which a user gives an instruction to the information terminal 51. The display unit 506 includes a liquid crystal display (LCD) or the like. Incidentally, the operating unit 505 may be a software key on a touch panel display of the display unit 506. The interface unit 507 is a microphone, a speaker, or the like. The acceleration sensor 508 is a sensor (detecting unit) that detects acceleration and can thereby detect inclination (an angle) of the device itself. Any sensor other than the acceleration sensor may be used as long as the sensor can detect inclination (an angle). The bus 509 connects the CPU 501, the ROM 502, the RAM 503, the communication unit 504, the operating unit 505, the display unit 506, the interface unit 507, and the acceleration sensor 508.

The CPU 501 implements various functions of the embodiment, such as a function to determine reception of various signals and a function to control display of information on the display unit 506. For example, the CPU 501 has a function (a second determining unit) to determine whether a start signal for starting communication is received from the NFC tag when the predetermined positional relationship is established between an NFC antenna (an example of a communication unit) and the NFC tag. Furthermore, the CPU 501 has a function (a first determining unit) to determine whether an establishing signal for establishing communication is received from the NFC tag. Moreover, the CPU 501 has a function (a display control unit) to display position information of the NFC antenna on the display unit 506.

In this way, the functions of the embodiment can be implemented by causing the CPU 501 to execute a program, that is, by software. These functions may be implemented by hardware, such as an integrated circuit (IC), or by a combination of software and hardware.

Next, an outline of the communication method for NFC used in the information processing apparatus according to the embodiment will be described. FIG. 4 is a diagram for explaining the outline of the communication method for NFC used in the information processing apparatus according to the embodiment.

The information terminal 51 is equipped with the NFC reader/writer 11, and means the master device. In the process at Step S301, the information terminal 51 transmits a request (REQ) to the NFC tag 21. If the NFC tag 21 receives the REQ, the NFC tag 21 returns an ATQ (ACK) signal in the process at Step S302. In this case, the information terminal 51 determines that a signal (start signal) for starting communication with the NFC tag 21 is received.

Thereafter, in the process at Step S303, the information terminal 51 transmits an ATTRIB signal to select the NFC tag 21. In the process at Step S304, the NFC tag 21 transmits an ATTRIB response and sends information on the NFC tag 21. The information on the NFC tag 21 is exchanged and the NFC tag 21 is confirmed. In this case, the information terminal 51 determines that a signal (establishing signal) for establishing communication with the NFC tag 21 is received. Then, in the process at Step S305, the information terminal 51 transmits a write command to the NFC tag 21.

If the NFC tag 21 recognizes the write command, the NFC tag 21 returns a response to the write command (a write command response) in the process at Step S306. If data is to be read, the information terminal 51 issues a read command to the NFC tag 21 in the process at Step S307. In the process at Step S308, the NFC tag 21 returns a read command response to the read command, and transmits data. A series of data writing and data reading is basically performed in accordance with the above-described flow.

The information terminal 51 continuously generates a magnetic field so that the information terminal 51 can perform communication at any time. NFC is a standard for short-distance wireless communication, and a communication distance is generally within 10 cm. The communication distance is different for each information terminal and is also influenced by a communication environment; however, the communication distance is usually around 3 to 4 cm. The communication distance depends on the intensity of the magnetic field generated in the information terminal.

Therefore, to smoothly perform communication with the NFC tag, it is necessary to hold the information terminal near the NFC tag such that the position of an antenna of the information terminal and the position of an antenna of the NFC tag match each other as best as possible in order to easily generate electromagnetic induction. However, a smartphone or a tablet PC does not clearly indicate the position of the NFC antenna, and therefore, a user may not know how to hold the information terminal near the NFC tag. Even when the information terminal is held at random, if position alignment between the antenna of the information terminal and the antenna of the NFC tag is not appropriate, communication is not started and it becomes necessary to move the information terminal to find out a point where the positions of the antennas match each other.

Furthermore, the position and the size of the NFC antenna are different for each information terminal, and it may be difficult to easily find out the position of the antenna even if search is performed, which may result in that communication is not enabled eventually and usability for a user is extremely reduced.

Next, variations of the position and the size of the NFC antenna mounted on the information processing apparatus according to the embodiment will be described. FIG. 5A to FIG. 5D are views for explaining variations of the position and the size of the NFC antenna mounted on the information processing apparatus according to the embodiment.

Figure 5A:
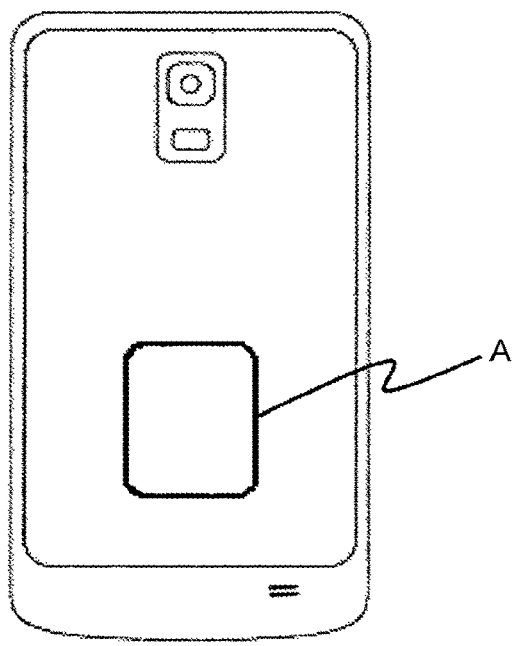
FIG. 5A is a view for explaining variations of a position and a size of an NFC antenna mounted on the information processing apparatus according to the embodiment.
Figure 5B:
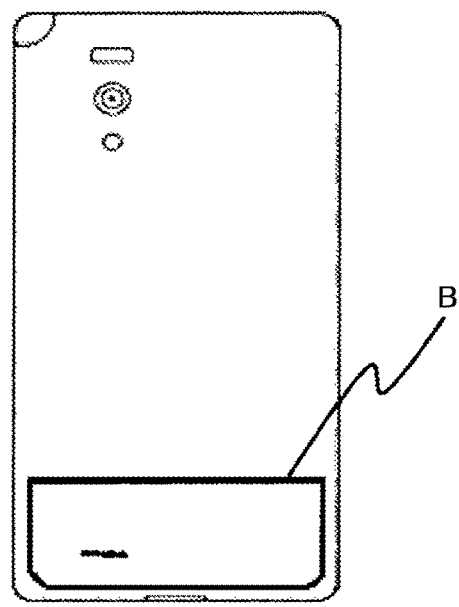
FIG. 5B is a view for explaining variations of the position and the size of the NFC antenna mounted on the information processing apparatus according to the embodiment.

FIG. 5A illustrates an example of a smartphone including an NFC antenna that is mounted on a single portion near the center (A) in the lower half of a surface of a body. FIG. 5B illustrates an example of a smartphone including an NFC antenna that is mounted on a single portion in the bottommost portion (B) of a back surface of a body.

Figure 5C:
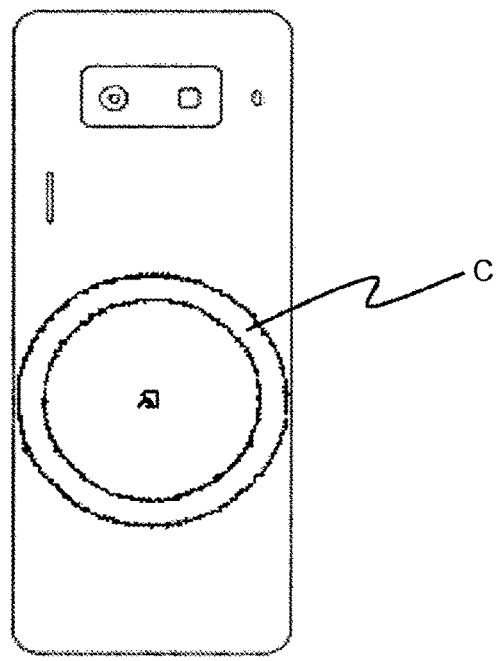
FIG. 5C is a view for explaining variations of the position and the size of the NFC antenna mounted on the information processing apparatus according to the embodiment.
Figure 5D:
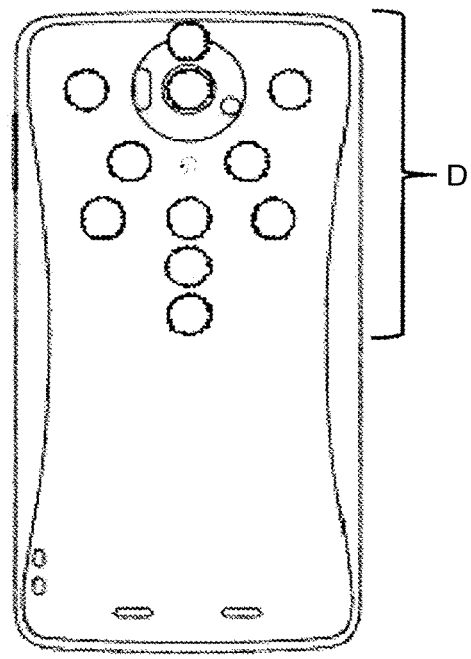
FIG. 5D is a view for explaining variations of the position and the size of the NFC antenna mounted on the information processing apparatus according to the embodiment.

FIG. 5C illustrates an example of a smartphone including an NFC antenna that has a circular shape and that is mounted on a single portion (C) below the approximate center of a surface of a body. FIG. 5D illustrates an example of a smartphone including NFC antennas that are mounted on a plurality of portions (D) in an upper half of a back surface of a body. As described above, the position and the size of the NFC antenna of the information terminal 51 are different depending on manufacturers and/or models.

If the NFC tag 21 includes an antenna having approximately the same size as the information terminal 51, it may be possible to perform NFC communication with high probability even when the NFC tag 21 is held near any portion of the information terminal 51. However, in reality, a mounting area in a device equipped with the NFC tag 21 is limited, and it is difficult to excessively increase the size of the antenna of the NFC tag 21.

Furthermore, metal is usually used in the device equipped with the NFC tag 21, and the metal has an influence on wireless communication. Therefore, it is difficult to greatly increase the area of the antenna. Consequently, by enabling position alignment between the NFC tag 21 and the information terminal 51 to be easily performed and enabling communication to start even when the information terminal 51, in which the NFC antenna may be mounted in an arbitrary position, is held near the NFC tag 21, in which the area of the antenna is small, it is possible to improve the usability.

Figure 6:
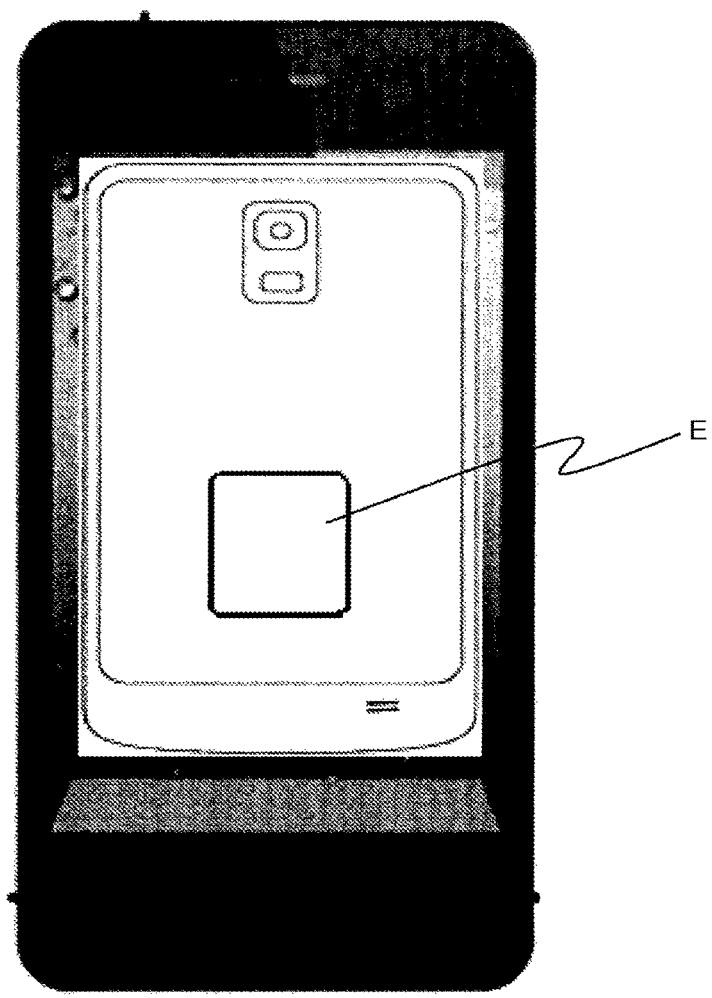
FIG. 6 is a view for explaining a state in which an application program installed in the information processing apparatus according to the embodiment displays the position of the NFC antenna.

Next, a state in which an application program installed in the information processing apparatus according to the embodiment displays the position of the NFC antenna will be described. FIG. 6 is a view for explaining the state in which the application program installed in the information processing apparatus according to the embodiment displays the position of the NFC antenna. The application program is an example of the function (display control unit) to display position information of the NFC antenna on the display unit 506.

A symbol E illustrated in FIG. 6 indicates an example of a state in which an application program that presents a position of an NFC antenna to a user displays the position of the NFC antenna. When the application program that displays the position of the NFC antenna is activated, the position of the NFC antenna mounted on the information terminal is displayed on a display unit of a smartphone or a tablet PC.

In the smartphone or the tablet PC, the NFC antenna is usually mounted on a back surface of each device. Therefore, as the way of display, a mounting position of the antenna on the back surface of the device is displayed. Furthermore, a range in which the antenna is disposed is different for each device. Therefore, if the center position and the range of the antenna are displayed, position alignment of the antenna with respect to the NFC tag becomes easier and the usability can be improved.

For example, in FIG. 6, the NFC antenna is mounted in a region indicated by the symbol E. The position and the mounting range of the antenna are information specific to a model; therefore, an application program corresponding to a used model is implemented.

To activate the application program that displays the position of the antenna, various methods may be used, such as a method of activating the application program when NFC read/write application software of the information terminal 51 is launched or a method of activating the application program when the information terminal 51 is held near the NFC tag 21. In the following, timing of activating the application program that displays the position of the antenna and a method of displaying the antenna will be described.

Figure 7:
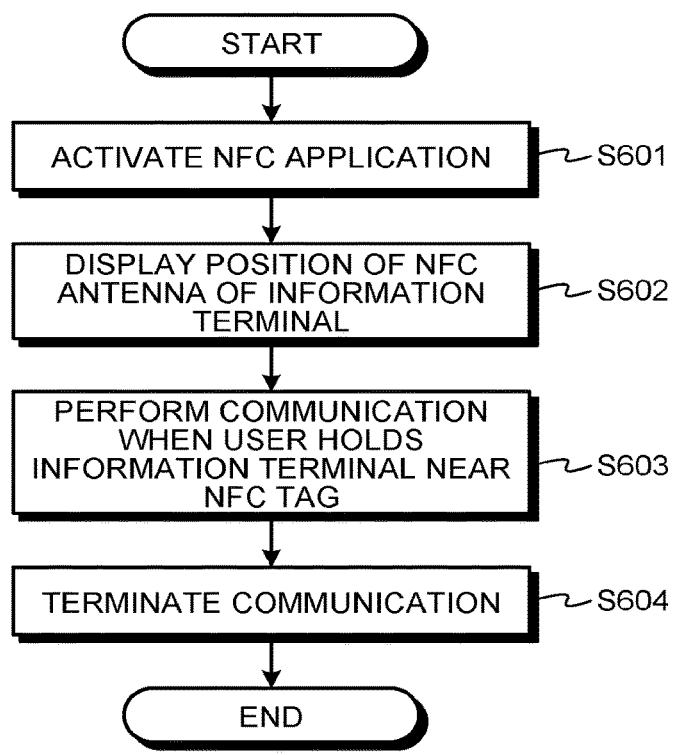
FIG. 7 is a flowchart for explaining a basic operation performed by an NFC antenna position information application program installed in the information processing apparatus according to the embodiment.

A basic operation performed by an NFC antenna position information application program installed in the information processing apparatus according to the embodiment will be described below. FIG. 7 is a flowchart for explaining the basic operation performed by the NFC antenna position information application program installed in the information processing apparatus according to the embodiment.

When the information terminal 51, such as a smartphone or a tablet PC, uses NFC, the information terminal 51 first activates an installed NFC application in the process at Step S601. The information terminal 51 launches an installed NFC antenna position information application simultaneously with the activation of the NFC application. Accordingly, in the process at Step S602, the position of the NFC antenna of the information terminal 51 is displayed. Incidentally, the NFC antenna position information application may be activated according to a condition that triggers activation.

In the process at Step S603, if a user performs operation of holding the information terminal 51 near the NFC tag 21 in accordance with the displayed antenna position information, communication is started. The NFC tag 21 and the information terminal 51 perform REQ transmission and ATQ response with each other as described above with reference to FIG. 4, and if preparation for communication is completed, execution of NFC communication is started. After data is exchanged successfully, the communication is terminated in the process at Step S604.

Figure 8:
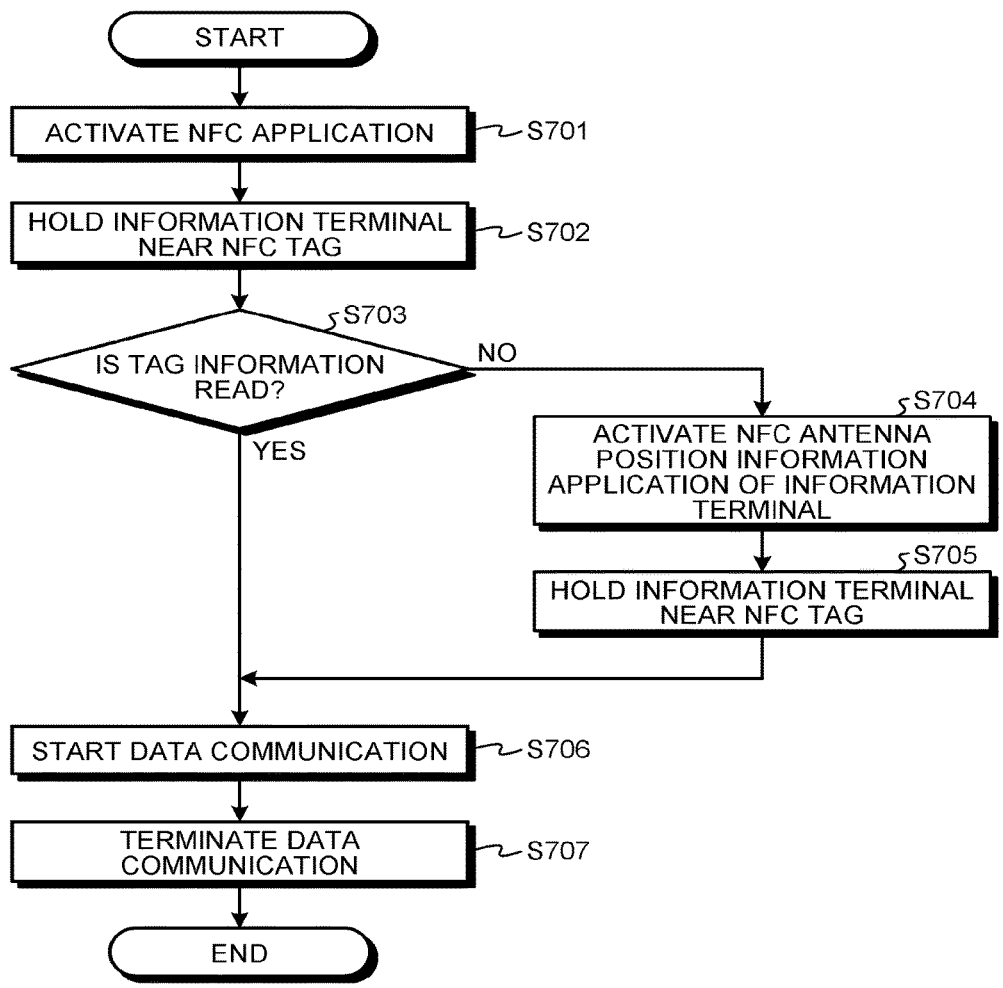
FIG. 8 is a flowchart for explaining operation regarding activation timing of the NFC antenna position information application program installed in the information processing apparatus according to the embodiment.

Next, operation regarding activation timing of the NFC antenna position information application program installed in the information processing apparatus according to the embodiment will be described. FIG. 8 is a flowchart for explaining the operation regarding activation timing of the NFC antenna position information application program installed in the information processing apparatus according to the embodiment.

When the information terminal 51 uses NFC, the information terminal 51 activates the installed NFC application in the process at Step S701. After a user or the like holds the information terminal 51 near the NFC tag 21 in the process at Step S702, the information terminal 51 determines whether tag information on the NFC tag 21 is read in the process at Step S703.

If it is determined that the tag information is read (YES at Step S703), the information terminal 51 immediately recognizes the tag information and starts data communication in the process at Step S706. After predetermined data is exchanged, the data communication is terminated in the process at Step S707.

In contrast, when the information terminal 51 is held near the NFC tag 21, and if it is determined that the tag information is not read at one time for the reason that electromagnetic induction is not generated due to misalignment of the antenna position, or the like (NO at Step S703), the process proceeds to Step S704. In the process at Step S704, the information terminal 51 activates the NFC antenna position information application program.

In the process at Step S705, when the user or the like holds the information terminal 51 near the NFC tag 21 again using the antenna position information, the process proceeds to Step S706, and execution of data communication is started. If the data communication is completed successfully, the data communication is terminated in the process at Step S707.

Figure 9:
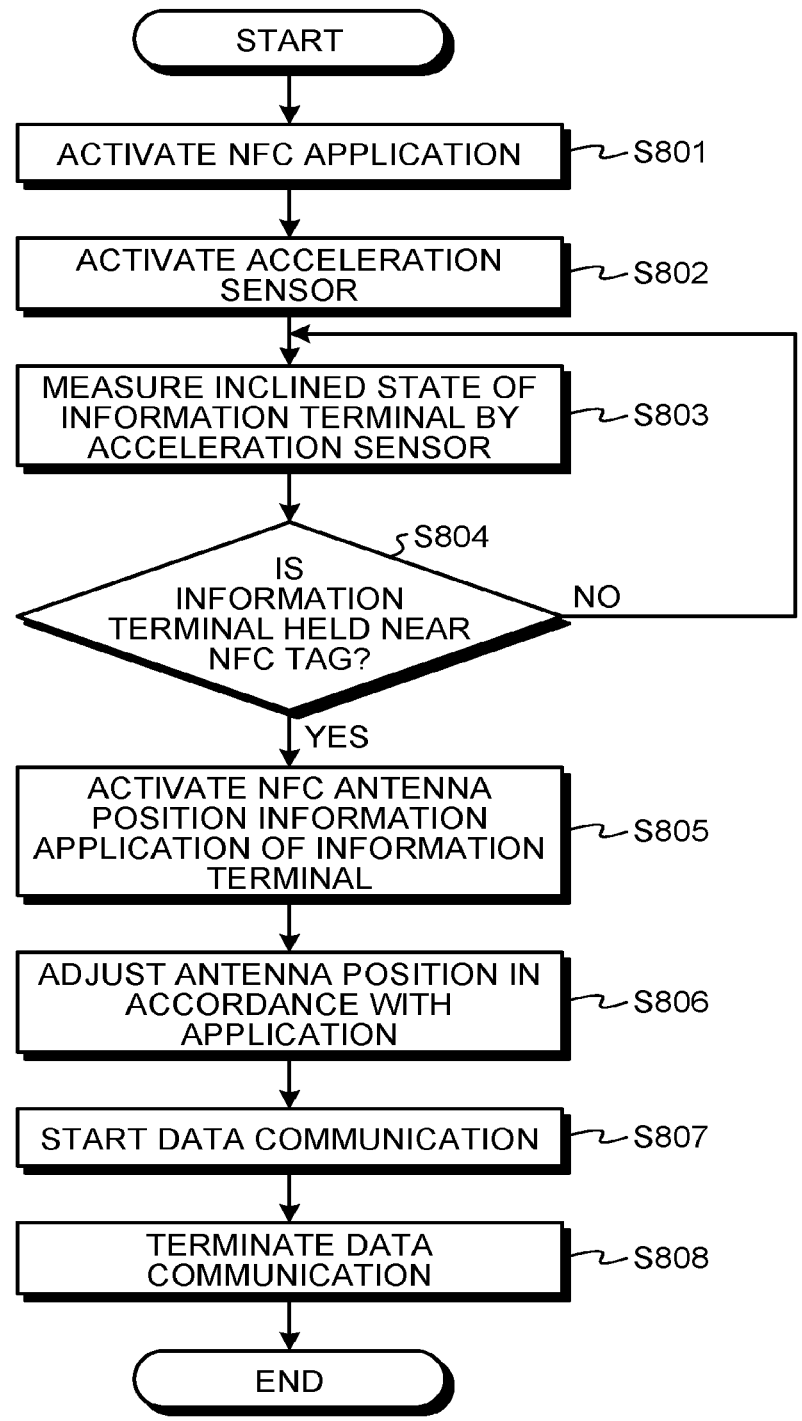
FIG. 9 is a flowchart for explaining operation regarding activation timing of the NFC antenna position information application program installed in the information processing apparatus according to the embodiment.

Next, another example of the operation regarding activation timing of the NFC antenna position information application program installed in the information processing apparatus according to the embodiment will be described. FIG. 9 is a flowchart for explaining the operation regarding activation timing of the NFC antenna position information application program installed in the information processing apparatus according to the embodiment.

As described above, the information terminal 51 includes the built-in acceleration sensor 508 that can detect inclination (an angle) of the own device. The acceleration sensor 508 is mainly used to detect orientation of a main body of the information terminal 51 and to determine whether to display an image in a portrait orientation or a landscape orientation on a display device. In the embodiment, the acceleration sensor 508 is used to determine that the main body of the information terminal 51 being held near the NFC tag 21 is inclined (angled) by a predetermined angle, and then the NFC antenna position information application program is activated.

In the process at Step S801, the information terminal 51 activates the installed NFC application. In the process at Step S802, the information terminal 51 activates the acceleration sensor 508. Incidentally, the acceleration sensor 508 may be operated at all times. Thereafter, in the process at Step S803, the information terminal 51 measures an inclined state of the information terminal 51 by the acceleration sensor 508. In the process at Step S804, the information terminal 51 determines whether the information terminal 51 is held near the NFC tag 21.

Incidentally, in the measurement of the inclined state, it may be possible to specify a predetermined angle to determine that the information terminal 51 is inclined. Furthermore, in the first place, the NFC function can be considered to be used when the NFC application is activated in the process at Step S801. Therefore, it may be possible to determine that the information terminal 51 is held near the NFC tag 21 if inclination by a slight angle is measured.

If it is determined that the information terminal 51 is not held near the NFC tag 21 (NO at Step S804), the process returns to Step S803, and the information terminal 51 continues to measure the inclined state of the information terminal 51 by the acceleration sensor 508. If it is determined that the information terminal 51 is held near the NFC tag 21 (YES at Step S804), the process proceeds to Step S805, and the information terminal 51 activates the NFC antenna position information application program.

Thereafter, in the process at Step S806, a user or the like adjusts the antenna position in accordance with the display by the NFC antenna position information application program. The information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21. If it is determined that the establishing signal for establishing communication with the NFC tag 21 is received from the NFC tag 21, the information terminal 51 starts execution of data communication in the process at Step S807. If the data communication is completed successfully, the data communication is terminated in the process at Step S808.

Figure 10:
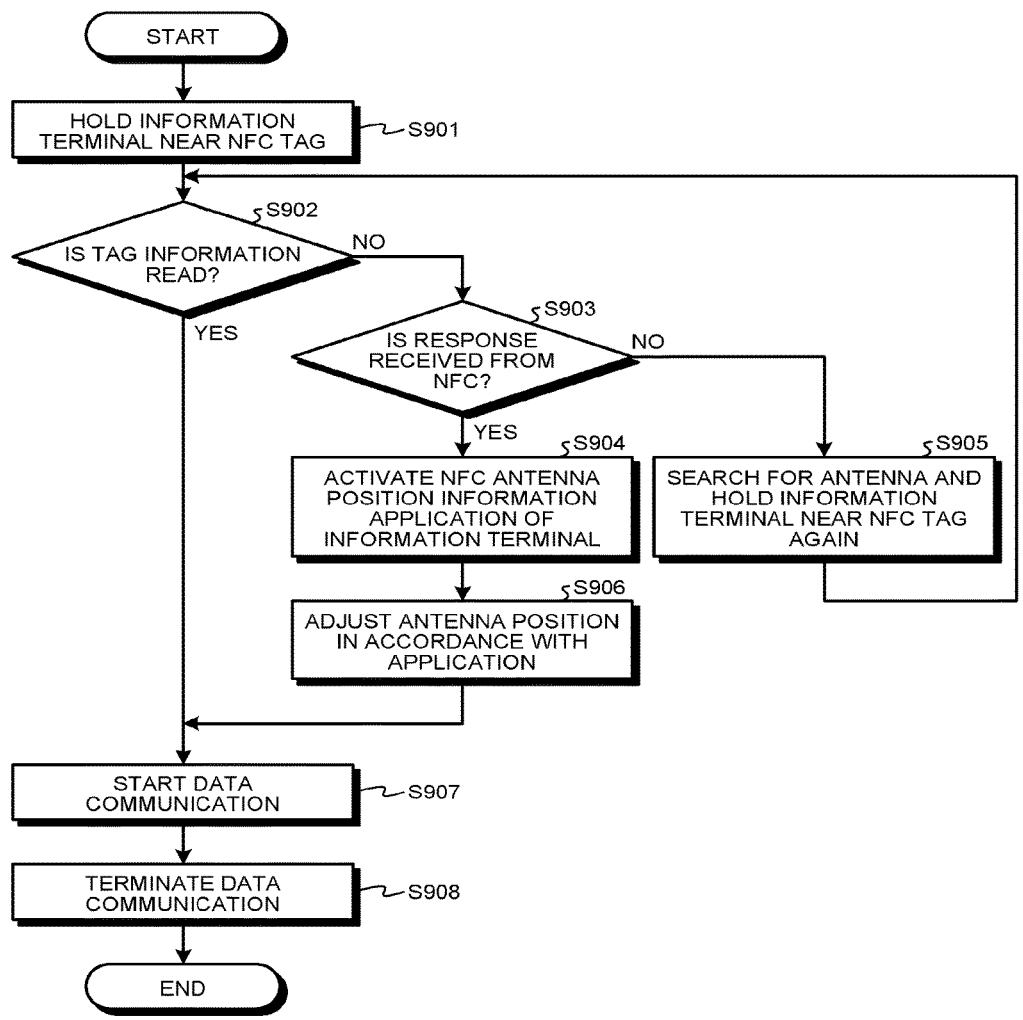
FIG. 10 is a flowchart for explaining operation regarding activation timing of the NFC antenna position information application program installed in the information processing apparatus according to the embodiment.

Next, another example of the operation regarding activation timing of the NFC antenna position information application program installed in the information processing apparatus according to the embodiment will be described. FIG. 10 is a flowchart for explaining the operation regarding activation timing of the NFC antenna position information application program installed in the information processing apparatus according to the embodiment.

When the NFC function is used, in some cases, the main body of the information terminal 51 may be held near the NFC tag without activation of the NFC application installed in the information terminal 51. In this case, if the tag information is not read, the NFC antenna position information application program in the information terminal 51 is activated, and position alignment of the antenna is performed.

In the process at Step S901, the information terminal 51 is held near the NFC tag 21 without activation of the installed NFC application. In the process at Step S902, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21.

If the signals are read (responded) at one time (YES at Step S902), the process proceeds to Step S907, and execution of data communication is directly started. Then, after predetermined data is read, the data communication is terminated in the process at Step S908.

If the signals are not read at one time even when the information terminal 51 is held near the NFC tag 21 (NO at Step S902), the information terminal 51 determines whether any response is received from the NFC tag 21 in the process at Step S903. For example, the information terminal 51 determines whether the start signal for starting communication with the NFC tag 21 is received from the NFC tag 21.

This is because, in some cases, electromagnetic induction may be generated when the information terminal 51 is held near the NFC tag 21, and data may not be appropriately read even through the attempt to exchange information. That is, this case corresponds to a case in which the antenna positions are not aligned and adequate electric power to activate the NFC tag 21 is not generated.

If it is determined that a response is received from the NFC tag 21 (YES at Step S903), the process proceeds to Step S904. In the process at Step S904, the information terminal 51 activates the NFC antenna position information application program to perform position alignment of the antenna again. In the process at Step S906, a user or the like adjusts the antenna position again. Consequently, it becomes possible to receive, from the NFC tag 21, the establishing signal for establishing communication with the NFC tag 21.

Therefore, it is not necessary to repeat alignment of the antenna position many times, so that it is possible to start data communication in a short time. In the process at Step S907, execution of the data communication is started. If the data communication is completed successfully, the data communication is terminated in the process at Step S908.

If it is determined that a response is not received from the NFC tag 21 (NO at Step S903), the process proceeds to Step S905, and the user or the like searches for the position of the antenna and holds the information terminal 51 near the NFC tag 21 again. Then, in the process at Step S902, the information terminal 51 determines whether the tag information on the NFC tag 21 is read.

Figure 11:
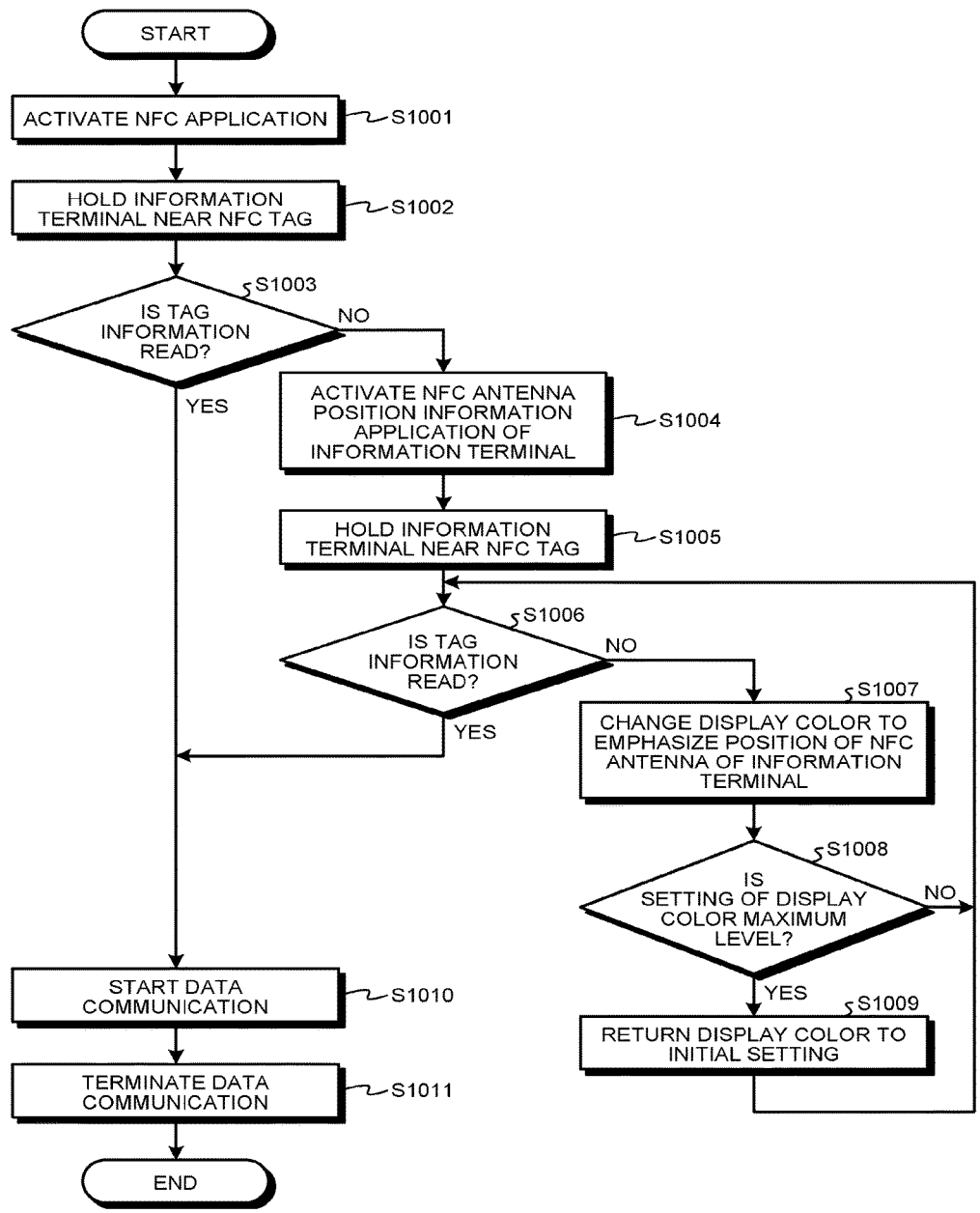
FIG. 11 is a flowchart for explaining operation of clarifying position display of the antenna by the NFC antenna position information application program installed in the information processing apparatus according to the embodiment.

Next, operation of clarifying position display of the antenna by the NFC antenna position information application program installed in the information processing apparatus according to the embodiment will be described. FIG. 11 is a flowchart for explaining the operation of clarifying the position display of the antenna by the NFC antenna position information application program installed in the information processing apparatus according to the embodiment. When the information terminal 51 is held near the NFC tag 21 in the process at Step S705 in FIG. 8, processes after the process of determining whether the information terminal 51 has read the tag information on the NFC tag 21 are added.

The processes from Step S1001 to Step S1005 and Step S1010 to Step S1011 in FIG. 11 are the same as the processes from Step S701 to Step S705 and Step S706 to Step S707 in FIG. 8 and therefore, detailed explanation thereof will be omitted.

By aligning the antenna position using the NFC antenna position information application program of the information terminal 51, it becomes easy to perform data communication. However, even when the antenna position is aligned, in some cases, it may be difficult to appropriately read data at one time. In this case, the antenna position information application program can change a display mode of the antenna position. Accordingly, the user can easily recognize the position of the antenna of the information terminal 51, and it becomes possible to guide the user to align the antenna position. As one method, it may be possible to use a method of changing the intensity of a display color or a display luminance of the position of the antenna in a stepwise manner.

In the process at Step S1006, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21.

If it is determined that the tag information is read (YES at Step S1006), the process proceeds to Step S1010. If it is determined that the tag information is not read (NO at Step S1006), the process proceeds to Step S1007. In the process at Step S1007, the information terminal 51 changes the intensity of the display color in a stepwise manner to emphasize the position of the NFC antenna, and the process proceeds to Step S1008.

In the process at Step S1008, the information terminal 51 determines whether the setting of the display color of the antenna position is the maximum level. If it is determined that the setting is not the maximum level (NO at Step S1008), the process proceeds to Step S1006, and the information terminal 51 determines again whether the tag information on the NFC tag 21 is read. If it is determined that the setting is the maximum level (YES at Step S1008), the process proceeds to Step S1009.

In the process at Step S1009, the information terminal 51 returns the intensity of the display color of the position of the NFC antenna to the initial level of the display color, and thereafter, the process proceeds to Step S1006, at which the information terminal 51 determines again whether the tag information on the NFC tag 21 is read. Incidentally, in the process at Step S1007, various methods may be used, such as a method of changing the intensity of the display color of the NFC antenna for each case, a method of causing the position of the NFC antenna to blink, or a method of changing the intensity of the display color for each blinking.

Figure 12:
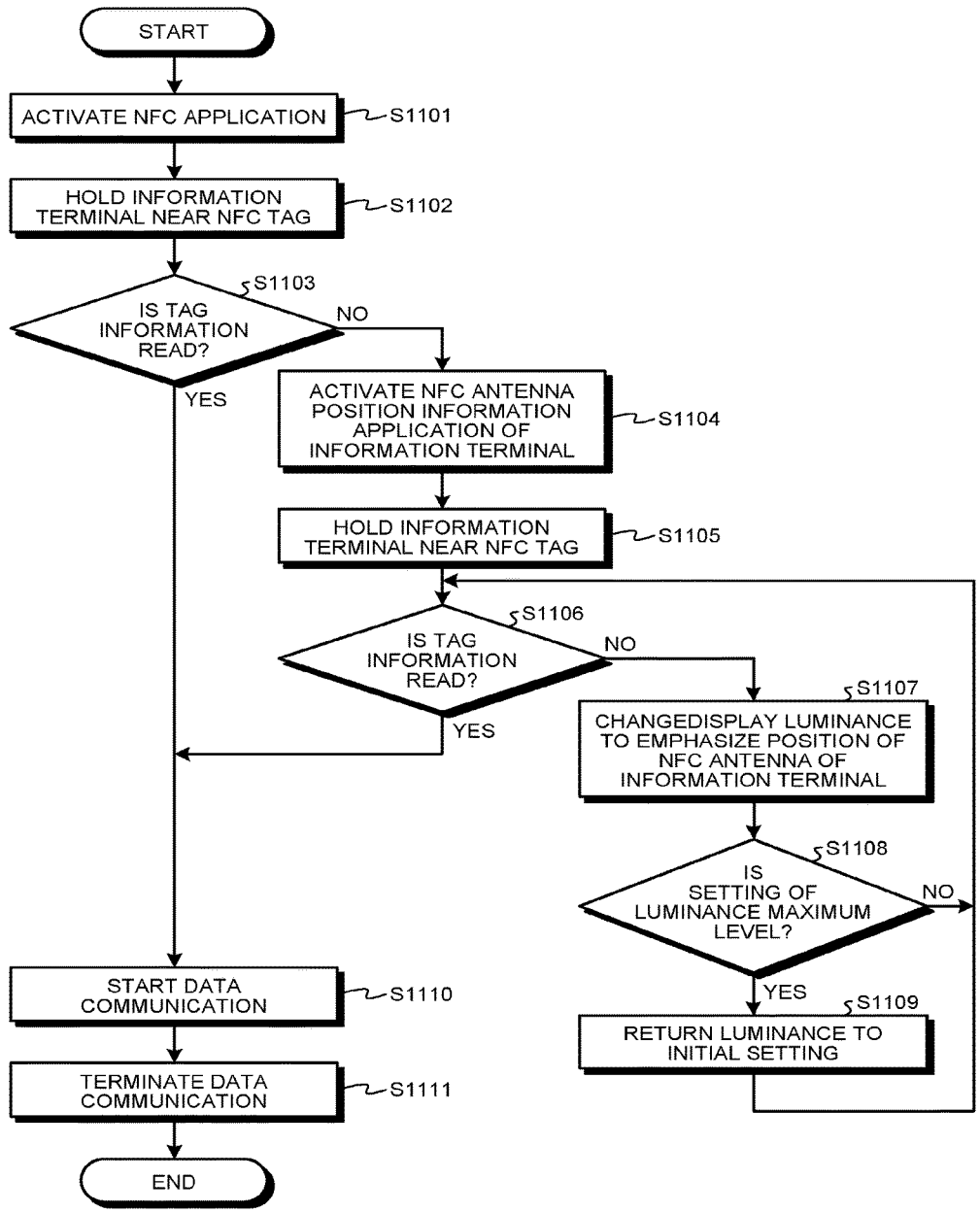
FIG. 12 is a flowchart for explaining operation of clarifying the position display of the antenna by the NFC antenna position information application program installed in the information processing apparatus according to the embodiment.

Next, another example of the operation of clarifying the position display of the antenna by the NFC antenna position information application program installed in the information processing apparatus according to the embodiment will be described. FIG. 12 is a flowchart for explaining the operation of clarifying the position display of the antenna by the NFC antenna position information application program installed in the information processing apparatus according to the embodiment.

In FIG. 12, processes after the information terminal 51 determines that the tag information on the NFC tag 21 is not read in the process at Step S1006 in FIG. 11 (NO at Step S1006) are changed. The processes from Step S1101 to Step S1106 and Step S1110 to Step S1111 in FIG. 12 are the same as the processes from Step S1001 to Step S1006 and Step S1010 to Step S1011 in FIG. 11, and therefore, detailed explanation thereof will be omitted.

In the process at Step S1106, if the information terminal 51 determines that the tag information on the NFC tag 21 is not read (NO at Step S1106), the process proceeds to Step S1107. In the process at Step S1107, the information terminal 51 changes a display luminance in a stepwise manner to perform a process of emphasis, and the process proceeds to Step S1108.

In the process at Step S1108, the information terminal 51 determines whether the setting of the display luminance is the maximum level. If it is determined that the setting of the luminance is not the maximum level (NO at Step S1108), the process proceeds to Step S1106, and the information terminal 51 determines again whether the tag information on the NFC tag 21 is read. If it is determined that the setting of the luminance is the maximum level (YES at Step S1108), the process proceeds to Step S1109. In the process at Step S1109, the information terminal 51 returns the display luminance of the position of the NFC antenna to the initial level, and thereafter, the process proceeds to Step S1106, at which the information terminal 51 determines again the tag information on the NFC tag 21 is read.

As described above, in FIG. 12, the display luminance of the antenna position is changed instead of changing the intensity of the display color illustrated in FIG. 11. Even when the position of the antenna is aligned, in some cases, it may be difficult to appropriately read data at one time. In this case, the antenna position information application program changes the display luminance of the antenna position. Accordingly, the user can easily recognize the position of the antenna of the information terminal 51, and it becomes possible to guide the user to align the antenna position. Furthermore, it may be possible to use a method of increasing the display luminance when there is no reaction at one time but if the positions of the antennas of the NFC tag 21 and the information terminal 51 come close to each other while the antenna positions are searched for.

Figure 13:
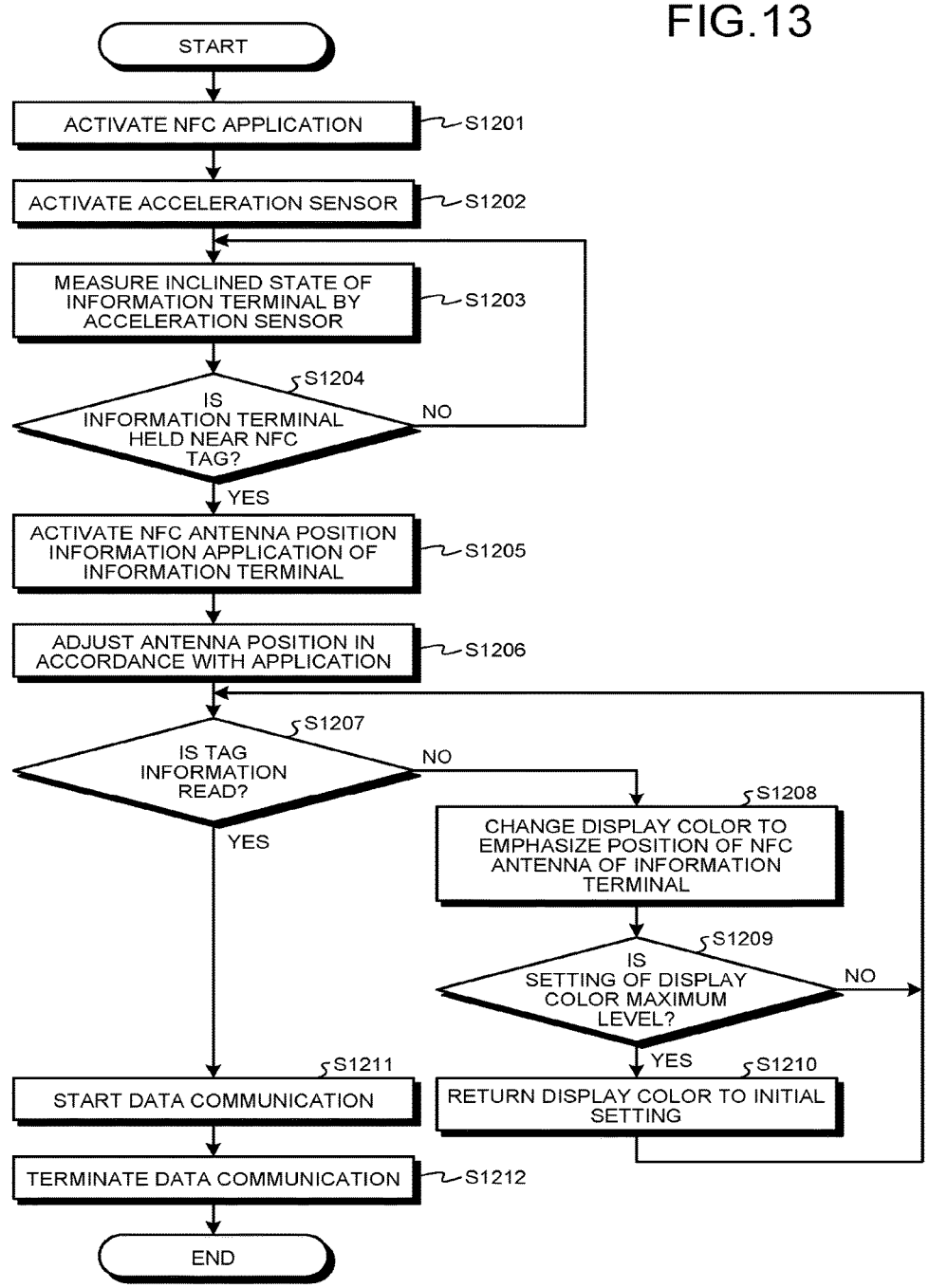
FIG. 13 is a flowchart for explaining operation of clarifying the position display of the antenna by the NFC antenna position information application program installed in the information processing apparatus according to the embodiment.

Next, another example of the operation of clarifying the position display of the antenna by the NFC antenna position information application program installed in the information processing apparatus according to the embodiment will be described. FIG. 13 is a flowchart for explaining the operation of clarifying the position display of the antenna by the NFC antenna position information application program installed in the information processing apparatus according to the embodiment. With respect to the process at Step S806 in FIG. 9, processes after the process of adjusting the antenna position in accordance with the NFC antenna position information application program are added.

The processes from Step S1201 to Step S1206 and Step S1211 to Step S1212 in FIG. 13 are the same as the processes from Step S801 to Step S806 and Step S807 to S808 in FIG. 9, and the processes from Step S1208 to Step S1210 in FIG. 13 are the same as the processes from Step S1007 to Step S1009 in FIG. 11; therefore, detailed explanation thereof will be omitted.

In the process at Step S1207, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21. If it is determined that the tag information is read (YES at Step S1207), the process proceeds to Step S1211. If it is determined that the tag information is not read (NO at Step S1207), the process proceeds to Step S1208.

Figure 14:
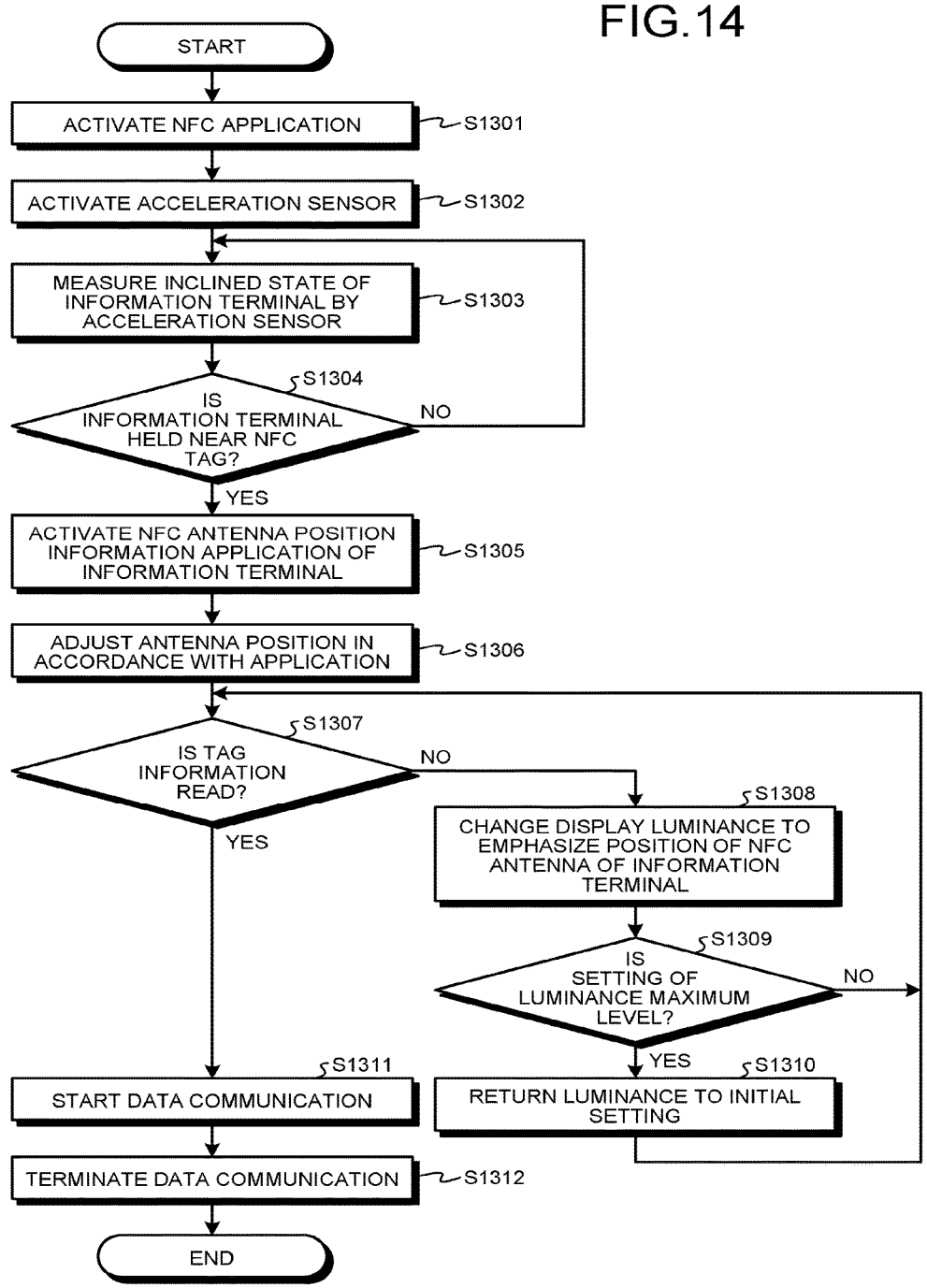
FIG. 14 is a flowchart for explaining operation of clarifying the position display of the antenna by the NFC antenna position information application program installed in the information processing apparatus according to the embodiment.

Next, another example of the operation of clarifying the position display of the antenna by the NFC antenna position information application program installed in the information processing apparatus according to the embodiment will be described. FIG. 14 is a flowchart for explaining the operation of clarifying the position display of the antenna by the NFC antenna position information application program installed in the information processing apparatus according to the embodiment. With respect to the process at Step S806 in FIG. 9, processes after the process of adjusting the antenna position in accordance with the NFC antenna position information application program are added.

The processes from Step S1301 to Step S1306 and Step S1311 to Step S1312 in FIG. 14 are the same as the processes from Step S801 to Step S806 and Step S807 to S808 in FIG. 9, and the processes from Step S1308 to Step S1310 in FIG. 14 are the same as the processes from Step S1107 to Step S1109 in FIG. 12; therefore, detailed explanation thereof will be omitted.

In the process at Step S1307, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21.

If it is determined that the tag information is read (YES at Step S1307), the process proceeds to Step S1311. If it is determined that the tag information is not read (NO at Step S1307), the process proceeds to Step S1308.

Figure 15:
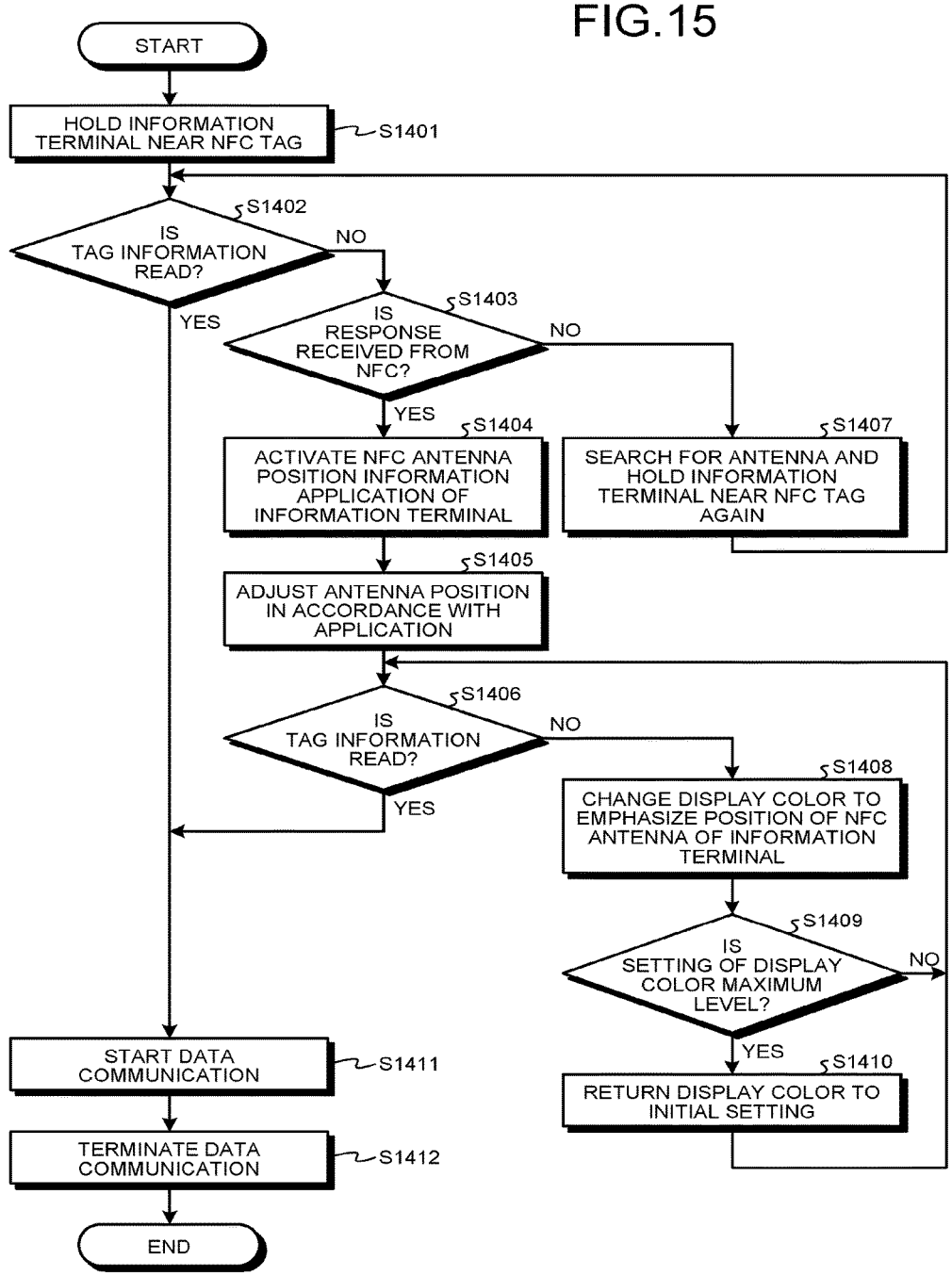
FIG. 15 is a flowchart for explaining operation of clarifying the position display of the antenna by the NFC antenna position information application program installed in the information processing apparatus according to the embodiment.

Next, another example of the operation of clarifying the position display of the antenna by the NFC antenna position information application program installed in the information processing apparatus according to the embodiment will be described. FIG. 15 is a flowchart for explaining the operation of clarifying the position display of the antenna by the NFC antenna position information application program installed in the information processing apparatus according to the embodiment. With respect to the process at Step S906 in FIG. 10, processes after the process of adjusting the antenna position in accordance with the NFC antenna position information application program are added.

The processes from Step S1401 to Step S1405 and Step S1407 in FIG. 15 are the same as the processes from Step S901 to Step S904, Step S906, and Step S905 in FIG. 10. The processes from Step S1411 to Step S1412 in FIG. 15 are the same as the processes from Step S907 to S908 in FIG. 10. The processes from Step S1408 to Step S1410 in FIG. 15 are the same as the processes from Step S1007 to Step S1009 in FIG. 11. Therefore, detailed explanation of the same processes will be omitted.

In the process at Step S1406, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21.

If it is determined that the tag information is read (YES at Step S1406), the process proceeds to Step S1411. If it is determined that the tag information is not read (NO at Step S1406), the process proceeds to Step S1408.

Figure 16:
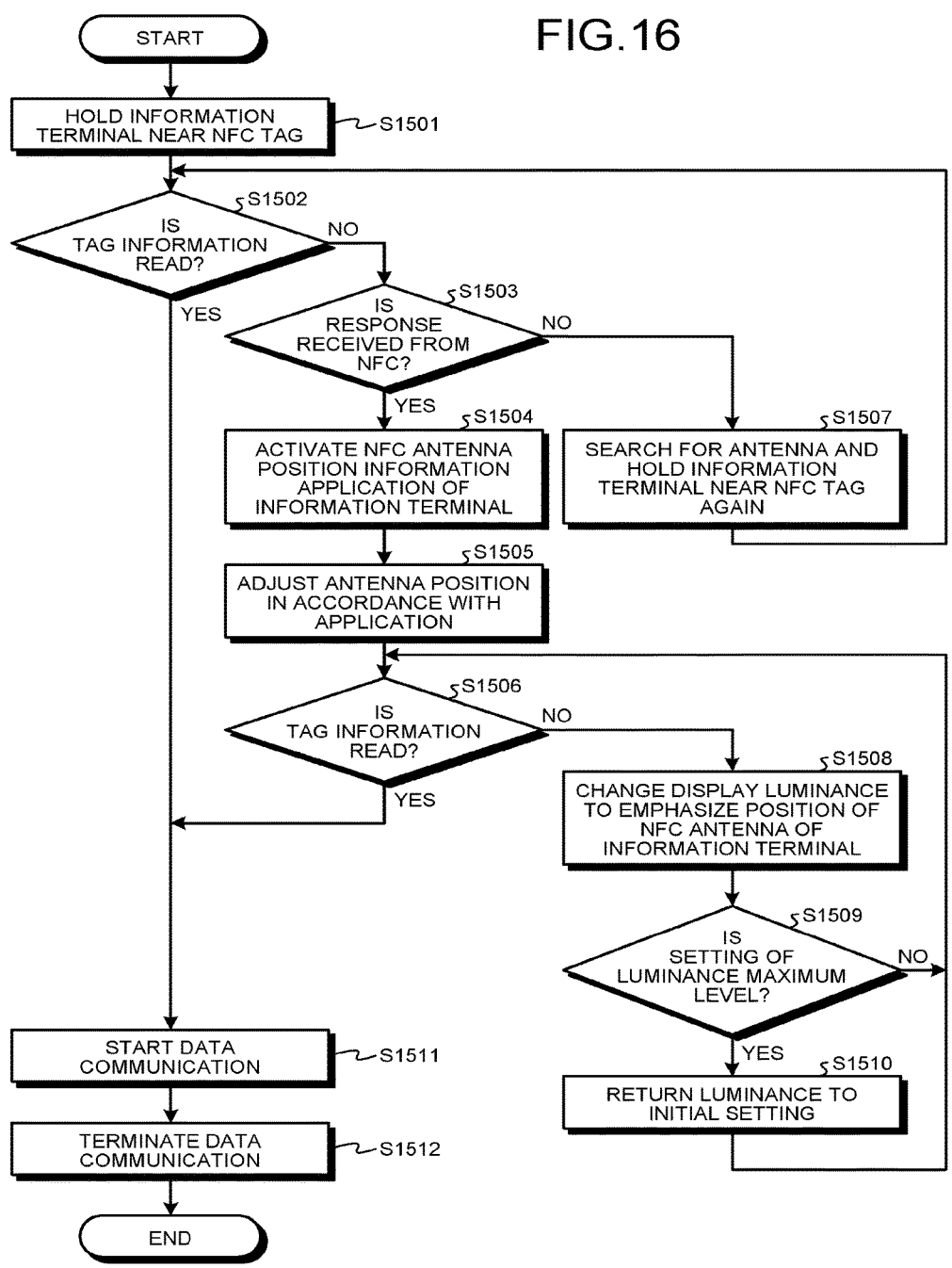
FIG. 16 is a flowchart for explaining operation of clarifying the position display of the antenna by the NFC antenna position information application program installed in the information processing apparatus according to the embodiment.

Next, another example of the operation of clarifying the position display of the antenna by the NFC antenna position information application program installed in the information processing apparatus according to the embodiment will be described. FIG. 16 is a flowchart for explaining the operation of clarifying the position display of the antenna by the NFC antenna position information application program installed in the information processing apparatus according to the embodiment. With respect to the process at Step S906 in FIG. 10, processes after the process of adjusting the antenna position in accordance with the NFC antenna position information application program are added.

The processes from Step S1501 to Step S1505 and Step S1507 in FIG. 16 are the same as the processes from Step S901 to Step S904, Step S906, and Step S905 in FIG. 10. The processes from Step S1511 to Step S1512 in FIG. 16 are the same as the processes from Step S907 to S908 in FIG. 10. The processes from Step S1508 to Step S1510 in FIG. 16 are the same as the processes from Step S1107 to Step S1109 in FIG. 12. Therefore, detailed explanation of the same processes will be omitted.

In the process at Step S1506, the information terminal 51 determines whether the tag information on the NFC tag 21 is read. For example, the information terminal 51 determines whether the start signal for starting communication with the NFC tag 21 and the establishing signal for establishing communication with the NFC tag 21 are received from the NFC tag 21.

If it is determined that the tag information is read (YES at Step S1506), the process proceeds to Step S1511. If it is determined that the tag information is not read (NO at Step S1506), the process proceeds to Step S1508.

Incidentally, in the above-described embodiment, it is assumed that the position information of the NFC antenna built in the information terminal 51 is stored in a storage unit, such as the ROM 502 or the RAM 503, in advance. However, it may be possible to acquire the position information of the NFC antenna from a different external device via a network (not illustrated) when the installed NFC application is activated or when the position information of the NFC antenna is displayed on the display unit 506.

The program executed by the information processing apparatus according to the embodiment is incorporated in the ROM 502 or the like in advance to provide the program.

The program executed by the information processing apparatus according to the embodiment may be recorded in a computer-readable recording medium, such as a compact disk read only memory (CD-ROM), a flexible disk (FD), a compact disk recordable (CD-R), or a digital versatile disk (DVD), in a computer-installable or a computer-executable file format to provide the program as a computer program product.

Furthermore, the program executed by the information processing apparatus according to the embodiment may be stored in a computer connected to a network, such as the Internet, and may be downloaded via the network to provide the program. Moreover, the program executed by the information processing apparatus according to the embodiment may be provided or distributed via a network, such as the Internet.

The program executed by the information processing apparatus according to the embodiment can cause a computer to function as each of the units included in the above-described information processing apparatus. The computer can cause the CPU 501 to load a program from a computer-readable recording medium onto a main storage device and to execute the program.

As described above, in the embodiment, the position of the NFC antenna mounted on the information terminal can be found easily when the NFC tag and the information terminal perform communication using NFC. Therefore, it is possible to easily recognize where the information terminal should be held. Furthermore, it is possible to start NFC communication without worrying about the position of the NFC antenna of the information terminal, so that it is possible to improve the usability for the user.

According to the embodiment, it is possible to obtain an information processing apparatus and a program capable of easily performing short-distance wireless communication.

According to an embodiment, it is possible to obtain an information processing apparatus that allows a user to easily perform short-distance wireless communication.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
a communication interface configured to perform communication with a short-distance wireless communication tag;
processing circuitry configured to determine whether an establishing signal for establishing the communication is received from the short-distance wireless communication tag, and in response to determining that the establishing signal is not received, display position information of the communication interface on a display; and
a sensor configured to detect whether the information processing apparatus is inclined,
wherein the communication interface is configured to perform the communication with the short-distance wireless communication tag in response to the processing circuitry determining that the establishing signal is received, and
when it is determined that the information processing apparatus is held near the short-distance wireless communication tag based on a detection result of the sensor, the processing circuitry displays position information of the communication interface.

2. The information processing apparatus according to claim 1, further comprising an application for performing the communication with the short-distance wireless communication tag, wherein when the processing circuitry determines that the establishing signal is not received after activation of the application, the processing circuitry is configured to display position information of the communication interface.

3. The information processing apparatus according to claim 1, further comprising an application for performing the communication with the short-distance wireless communication tag, wherein
when it is detected that the information processing apparatus is inclined by a predetermined angle after activation of the application, the processing circuitry displays position information of the communication interface.

4. The information processing apparatus according to claim 1, wherein the processing circuitry is further configured to determine whether a start signal for starting the communication is received from the short-distance wireless communication tag when a predetermined positional relationship is established between the communication interface and the short-distance wireless communication tag, wherein
when the processing circuitry determines that the start signal is received and when the processing circuitry determines that the establishing signal is not received, the processing circuitry displays position information of the communication interface.

5. The information processing apparatus according to claim 1, wherein when the processing circuitry determines that the establishing signal is not received, the processing circuitry is configured to change a display color of the position information of the communication interface on the display.

6. The information processing apparatus according to claim 5, wherein
the processing circuitry is configured to change an intensity of the display color in a stepwise manner, and
the processing circuitry is configured to determine whether the establishing signal is received until the display color is changed to a maximum level.

7. The information processing apparatus according to claim 1, wherein when the processing circuitry determines that the establishing signal is not received, the processing circuitry changes a display luminance of position information of the communication interface on the display.

8. The information processing apparatus according to claim 7, wherein
the processing circuitry is configured to change the display luminance in a stepwise manner, and
the processing circuitry is configured to determine whether the establishing signal is received until the display luminance is changed to a maximum level.

9. The information processing apparatus according to claim 1, further comprising a memory storing the position information of the communication interface.

10. The information processing apparatus according to claim 1, wherein the position information of the communication interface is acquired from an outside of the information processing apparatus.

11. A non-transitory recording medium containing an information processing program, the program causing an information processing apparatus including a built-in communication interface to perform communication with a short-distance wireless communication tag and a sensor to detect whether the information processing apparatus is inclined, to perform a method comprising:
determining whether an establishing signal for establishing the communication is received from the short-distance wireless communication tag;

in response to determining that the establishing signal is not received, displaying position information of the communication interface on a display; and performing communication with the short-distance wireless communication tag in response to determining that the establishing signal is received, wherein when it is determined that the information processing apparatus is held near the short-distance wireless communication tag based on a detection result of the sensor, the method further comprises displaying position information of the communication interface.

12. A method performed by an information processing apparatus that includes a built-in communication interface to perform communication with a short-distance wireless communication tag and a sensor to detect whether the information processing apparatus is inclined, the method comprising:

determining whether an establishing signal for establishing the communication is received from the short-distance wireless communication tag;

in response to determining that the establishing signal is not received, displaying position information of the communication interface on a display; and performing communication with the short-distance wireless communication tag in response to determining that the establishing signal is received, wherein when it is determined that the information processing apparatus is held near the short-distance wireless communication tag based on a detection result of the sensor, the method further comprises displaying position information of the communication interface.

* * * * *